(12) United States Patent
Shimojo et al.

(10) Patent No.: US 6,759,465 B1
(45) Date of Patent: Jul. 6, 2004

(54) THERMOPLASTIC RESIN COMPOSITION AND INJECTION-MOLDED OBJECT THEREOF

(75) Inventors: Moriyasu Shimojo, Ichihara (JP); Kenichi Ohkawa, Ichihara (JP); Susumu Kanzaki, Kisarazu (JP); Takayuki Nagai, Ann Arbor, MI (US); Takao Nomura, Toyota (JP); Masatoshi Matsuda, Toyota (JP); Hisayuki Iwai, Aichi-ken (JP)

(73) Assignees: Sumitomo Chemical Company, Limited, Osaka (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/720,343

(22) PCT Filed: Apr. 24, 2000

(86) PCT No.: PCT/JP00/02665

§ 371 (c)(1),
(2), (4) Date: Dec. 22, 2000

(87) PCT Pub. No.: WO00/64972

PCT Pub. Date: Nov. 2, 2000

(30) Foreign Application Priority Data

Apr. 26, 1999 (JP) .......................................... 11-118001

(51) Int. Cl.⁷ ................................................. C08K 3/34
(52) U.S. Cl. ......................... 524/451; 525/88; 525/95; 525/240; 525/242
(58) Field of Search ......................... 524/451; 525/240, 525/242, 88, 95

(56) References Cited

U.S. PATENT DOCUMENTS

| | | | | |
|---|---|---|---|---|
| 5,391,618 A | * | 2/1995 | Yamamoto et al. | 525/88 |
| 5,723,527 A | * | 3/1998 | Sadatoshi et al. | 524/451 |
| 5,750,612 A | * | 5/1998 | Zyagawa et al. | 524/451 |
| 5,763,534 A | * | 6/1998 | Srinivasan et al. | 525/240 |
| 5,880,198 A | * | 3/1999 | Kobayashi et al. | 524/451 |
| 5,889,099 A | * | 3/1999 | Nagai et al. | 524/451 |
| 5,914,363 A | | 6/1999 | Sadatoshi et al. | 524/451 |
| 5,965,654 A | * | 10/1999 | Hirata et al. | 524/451 |
| 6,011,102 A | | 1/2000 | Shimojo et al. | 524/451 |
| 6,180,709 B1 | * | 1/2001 | Nishio et al. | 524/451 |
| 6,300,415 B1 | * | 10/2001 | Okayama et al. | 525/191 |
| 6,323,286 B1 | * | 11/2001 | Kuramochi et al. | 525/323 |

FOREIGN PATENT DOCUMENTS

| | | | | |
|---|---|---|---|---|
| DE | 198 21 718 | | 11/1998 | ........... C08L/23/12 |
| EP | 0 784 074 A1 | | 7/1997 | |
| EP | 0 831 125 A1 | | 3/1998 | |
| EP | 0 872 517 A1 | | 10/1998 | |
| JP | 51-136735 | | 11/1976 | ........... C08L/23/02 |
| JP | 6-9836 | | 1/1994 | ........... C08L/23/10 |
| JP | 6-192500 | | 7/1994 | ........... C08L/23/10 |
| JP | 6-192506 | | 7/1994 | ........... C08L/23/12 |
| JP | 7-138421 | | 5/1995 | ........... C09L/23/10 |
| JP | 9-278954 | | 10/1997 | ........... C08L/23/10 |

* cited by examiner

*Primary Examiner*—Edward J. Cain
*Assistant Examiner*—Katarzyna Wyrozebski
(74) *Attorney, Agent, or Firm*—Sughrue Mion, PLLC

(57) ABSTRACT

A thermoplastic composition which is obtained by melt-kneading (1) 55 to 75 wt. % crystalline polypropylene resin together with (2) 10 to 30 wt. % elastomer comprising either a rubber containing a vinyl aromatic compound or a mixture thereof with an ethylene/α-olefin random copolymer rubber and (3) 15 to 25 wt. % talc having an average particle diameter of 3 µm or smaller. The composition satisfies specific requirements with respect to: the long period obtained by X-ray small-angle scattering attributable to the vinyl aromatic-containing rubber in a blend obtained by melt-kneading the ingredients (1) and (2); the shape and diameter of the elastomer particles present near the polypropylene/elastomer interface in the blend; and the difference between the glass transition point of the ingredient (1) and that of the composition attributable to the crystalline polypropylene homopolymer parts. The composition has a satisfactory balance between impact resistance and rigidity and has excellent injection moldability.

7 Claims, No Drawings

THERMOPLASTIC RESIN COMPOSITION AND INJECTION-MOLDED OBJECT THEREOF

TECHNICAL FIELD

This invention relates to a thermoplastic resin composition having excellent characteristic features in rigidity, impact resistance and moldability and to injection moldings excellent in dimensional stability formed therefrom by an injection molding method, particularly injection moldings for automobile if interior and exterior trims.

BACKGROUND ART

In recent years, propylene-ethylene block copolymers have been used as automobile materials from the view points of weight reduction and cost reduction. However, previous propylene-ethylene block copolymer materials are low in impact resistance; to improve the impact resistance, it has been proposed to compound into propylene-ethylene block copolymers an ethylene-propylene copolymer rubber, ethylene-α-olefin copolymer rubber or the like. When an ethylene-propylene copolymer rubber, ethylene-α-olefin copolymer rubber or the like is compounded, however, though the resulting composition is improved in impact strength, the composition conversely shows a lowered rigidity and deteriorated thermal properties such as heat distortion temperature, and hence has difficulties for use as automobile interior and exterior trim materials. To solve the problems, it has been proposed to compound additionally into the composition inorganic fillers, such as calcium carbonate, barium sulfate, mica, crystalline calcium silicate and talc.

For example, JP-A-51-136735 discloses a thermoplastic resin composition comprising an ethylene-block copolymer mainly based on propylene, an ethylene-propylene rubber and talc, and describes the physical properties thereof. It also describes, only in general, that styrene-butadiene rubbers can be used similarly to the ethylene-propylene rubber, but it describes nothing about the structure and state of the product obtained by melt-kneading the rubber and about the molecular weight distribution, melt flow rate, styrene content, etc. of the rubber.

JP-A-6-192,500 discloses a propylene-based resin composition comprising a propylene-ethylene block copolymer and an ethylene-1-hexene copolymer. It further describes as additional compounding ingredients, the blend of talc or the like, which are auxiliary additive components conventionally used in the process for producing resin compositions, and styrene-butadiene type rubbers or the like. However, it describes nothing about the structure and state of the product obtained by melt-kneading the rubber and about the molecular weight distribution, melt flow rate, styrene content, etc. of the rubber.

JP-A-6-192506 discloses a polypropylene composition comprising polypropylene, ethylene-1-octene random copolymer and talc, but it describes nothing of the use of vinyl aromatic compound-containing rubbers.

As described above, previous resin compositions comprising a propylene-ethylene block copolymer, ethylene-propylene copolymer rubber or ethylene-α-olefin copolymer rubber and inorganic filler have been, as automobile interior and exterior trim materials, still insufficient in the balance of impact strength with rigidity and in injection moldability. Further, prior technologies for using styrene-butadiene type rubbers or the like have also been unsatisfactory.

DISCLOSURE OF THE INVENTION

Under such circumstances, the object of this invention is to provide a polypropylene-based resin composition comprising a crystalline polypropylene-based resin, elastomer and talc which satisfies, in respect of physical properties, the impact resistance and rigidity required for automobile interior and exterior trim materials and is excellent in injection moldability and to provide injection moldings thereof, particularly injection moldings for automobile interior and exterior trim uses.

The present inventors have found that a polypropylene-based resin composition and injection moldings thereof which can meet the above-mentioned objects can be obtained by using a specific crystalline polypropylene-based resin as the main component and melt-kneading therewith, in specific compounding ratios, a specific elastomer component and talc, and resultantly attained this invention.

Thus, this invention relates to a thermoplastic resin composition which is obtained by melt-kneading a mixture comprising (1) 55–75% by weight of a crystalline polypropylene-based resin, (2) 10–30% by weight of an elastomer comprising a vinyl aromatic compound-containing rubber or comprising a vinyl aromatic compound-containing-rubber and an ethylene-α-olefin random copolymer rubber and (c) 15–25% by weight of talc having an average particle diameter of not more than 3 μm, and which satisfies the following conditions (a)–(c):

(a) when the crystalline polypropylene-based resin (1) has been melt-kneaded with the elastomer (2) comprising a vinyl aromatic compound-containing rubber or comprising a vinyl aromatic compound-containing rubber and an ethylene-a-olefin random copolymer rubber, the long period obtained by small angle X-ray scattering attributable to the vinyl aromatic compound-containing rubber is 12–24 nm, (b) when the crystalline polypropylene-based resin (1) has been melt-kneaded with the elastomer (2) comprising a vinyl aromatic compound-containing rubber or comprising a vinyl aromatic compound-containing rubber and an ethylene-α-olefin random copolymer rubber, elastomer particles which undergo micro phase separation to have the form of particle, and are present in the vicinity of the interface between particles of the elastomer and the crystalline polypropylene-based resin as matrix, have a particle diameter of not more than 30 nm, and (c) the difference between the glass transition point ($Tg_1$) assigned to the crystalline propylene homopolymer portion of the crystalline polypropylene-based resin (1) and the glass transition point ($Tg_2$) assigned to the crystalline propylene homopolymer portion of a composition obtained by melt-kneading the crystalline polypropylene-based resin (1) with the elastomer (2) comprising a vinyl aromatic compound-containing rubber or comprising a vinyl aromatic compound-containing rubber and an ethylene-α-olefin random copolymer rubber and talc (3) (that is, $\Delta Tg = Tg_1 - Tg_2$) is 4.0–7.0° C.

This invention also relates to injection moldings formed from the above-mentioned polypropylene-based resin composition by an injection molding method.

This invention further relates to injection moldings for automobile interior and exterior trim uses.

BEST MODE FOR CARRYING OUT THE INVENTION

This invention is described in detail below.

The thermoplastic resin composition of this invention is a composition obtained by melt-kneading a mixture comprising (1) 55–75% by weight of a crystalline polypropylene-based resin, (2) 10–30% by weight of an elastomer comprising a vinyl aromatic compound-containing rubber or comprising a vinyl aromatic compound-containing rubber and an ethylene-α-olefin random copolymer rubber and (3) 15–25% by weight of talc having an average particle diameter of not more than 3 μm.

The crystalline polypropylene-based resin (1) used in this invention is not particularly limited so long as it is crystalline and may be, for example, propylene homopolymers, propylene-ethylene copolymers and propylene-α-olefin copolymers. The α-olefin in the copolymer has at least 4 carbon atoms and may be, for example, butene, pentene, hexene, heptene, octene, decene and the like.

Particularly preferably used crystalline polypropylene-based resin (1) is a crystalline polypropylene selected from a crystalline ethylene-propylene block copolymer (1A) or a mixture (1B) of the crystalline ethylene-propylene block copolymer (1A) with a crystalline propylene homopolymer.

The crystalline ethylene-propylene block copolymer (1A) herein referred to is a crystalline ethylene-propylene block copolymer consisting essentially of a propylene homopolymer portion (hereinafter referred to as the first segment) and an ethylene-propylene random copolymer portion (hereinafter referred to as the second segment).

The propylene homopolymer portion, which is the first segment, has a Q value of preferably 3.0–5.0, more preferably 3.5–4.5, which value is the weight average molecular weight (Mw)/number average molecular weight (Mn) ratio determined by the gel permeation chromatography (GPC) method. Further, the portion has an isotactic pentad fraction of preferably not less than 0.98, more preferably not less than 0.99, as calculated from its $^{13}$C-NMR, and has an intrinsic viscosity $[\eta]_p$ of preferably 0.7–1.1 dl/g, more fit preferably 0.8–1.0 dl/g as measured in tetralin solution at 135° C.

When the Q value of the propylene homopolymer portion of the first segment is less than 3.0, the fluidity tends to be poor, and when the Q value exceeds 5.0, a good result cannot be obtained in the balance of rigidity with impact resistance in some cases. Further, when the isotactic pentad fraction of the portion is less than 0.98, it is difficult to attain the intended rigidity, heat resistance and the like in some cases. When the intrinsic viscosity $[\eta]_p$ of the portion is less than 0.7 dl/g the impact strength tends to be low, and when it exceeds 1.1 dl/g, the fluidity tends to deteriorate.

The ethylene-propylene random copolymer portion of the second segment has an intrinsic viscosity $[\eta]_{EP}$ of preferably 5.0–8.0 dl/g, more preferably 5.5–7.5 dl/g as determined in tetralin solution at 135° C., and has an ethylene content $[(C2')_{EP}]$ of preferably 25–35% by weight, more preferably 27–33% by weight.

When the intrinsic viscosity $[\eta]_{EP}$ of the ethylene-propylene random copolymer portion of the second segment is less than 5.0 dl/g, a good result cannot be obtained in the balance of rigidity with impact resistance in some cases. When it exceeds 8.0 dl/g, hard spots tend to develop and a good result cannot be obtained in respect of surface quality in some cases. When the ethylene content $[(C2')_{EP}]$ of the portion is less than 25% by weight or higher than 35% by weight, a good result cannot be obtained in respect of the impact resistance of the composition in some cases.

The ratio of the ethylene-propylene random copolymer portion (the second segment) to the propylene homopolymer portion (the first segment) (namely, the second segment/the first segment) by weight is preferably 8/92 to 35/65.

The crystalline propylene homopolymer used in the above-mentioned mixture (1B) of the crystalline ethylene-propylene block copolymer (1A) with the crystalline propylene homopolymer is a polymer which have similar physical properties to those of the propylene homopolymer portion of the first segment. Thus, it has a Q value of 3.0–5.0, preferably 3.5–4.5, which value is the ratio of the weight average molecular weight (Mw) to the number average molecular weight (Mn) determined by the gel permeation chromatography (GPC) method, an isotactic pentad fraction, calculated from its $^{13}$C-NMR, of preferably not less than 0.98, more preferably not less than 0.99, and an intrinsic viscosity $[\eta]_p$ of preferably 0.7–1.1 dl/g, more preferably 0.8–1.0 dl/g as determined in tetralin solution at 135° C.

When the Q value of the crystalline propylene homopolymer used in the mixture (1B) of the crystalline ethylene-propylene block copolymer (1A) with a crystalline propylene homopolymer is less than 3.0, the fluidity tends to be poor, and when it exceeds 5.0, an unfavorable result is obtained in the balance of rigidity with impact resistance in some cases. Further, when the isotactic pentad fraction is less than 0.98, the intended rigidity, heat resistance and the like are hardly attained in some cases. Further, when the intrinsic viscosity $[\eta]_p$ is less than 0.7 dl/g, the impact resistance tends to be low, and when it exceeds 1.1 dl/g, the fluidity tends to be poor.

The crystalline polypropylene-based resin (1) can be produced by using a Ziegler-Natta catalyst system and/or a metallocene catalyst system according to a bulk polymerization method, a solution polymerization method, a slurry polymerization method, a gas phase polymerization method, or any desired combination of these polymerization methods.

When the ethylene-propylene block copolymer is used in applications wherein a high impact resistance is particularly required, the block copolymer is preferably a product obtained by polymerizing propylene in the first step to produce a crystalline propylene homopolymer portion of the first segment and then polymerizing ethylene and propylene in the second step to produce an ethylene-propylene random copolymer portion of the second segment.

In the thermoplastic resin composition of this invention, the content of the crystalline polypropylene-based resin (1) is preferably 55–75% by weight relative to the whole of the composition.

Description is given below of the elastomer (2) comprising a vinyl aromatic compound-containing rubber or comprising a vinyl aromatic compound-containing rubber and an ethylene-α-olefin random copolymer rubber used in this invention.

The vinyl aromatic compound-containing rubber (2A) referred to in this invention is a block copolymer composed of a vinyl aromatic compound polymer block and a conjugated diene-based polymer block wherein 80% or more, preferably 85% or more of the double bonds of its conjugated diene portion have been hydrogenated and it has a Q value, determined by the GPC method, of preferably not more than 2.5, more preferably not more than 2.3, has a vinyl aromatic compound content in the vinyl aromatic compound-containing rubber of preferably 10–20% by weight, more preferably 12–19% by weight, and has a melt flow rate (hereinafter referred to as "MFR") (according to JIS-K-6758, 230° C.) of preferably 1–15 g/10 min, more preferably 2–13 g/10 min.

The vinyl aromatic compound-containing rubber (2A) in this invention is a rubber which comprises an olefin-based copolymer rubber or conjugated diene rubber and a vinyl aromatic compound bonded to said rubber through polymerization, reaction, etc., and may be, for example, such block copolymers as styrene-ethylene-butene-styrene type rubber (SEBS), styrene-ethylene-propylene-styrene type rubber (SEPS), styrene-butadiene type rubber (SBR), styrene-butadiene-styrene type rubber (SBS) and styrene-isoprene-styrene type rubber (SIS) and further block copolymers resulting from hydrogenation of the rubber components thereof. Rubbers obtained by reacting a vinyl aromatic compound, such as styrene, to an ethylene-propylene-nonconjugated diene type rubber (EPDM) may also be favorably used.

When the vinyl aromatic compound content in the vinyl aromatic compound-containing rubber (2A) is, on the average, lower than 10% by weight or higher than 20% by weight, the affinity of the rubber to the crystalline polypropylene-based resin (1) tends to be low, and resultantly the impact resistance and the rigidity tend to decrease.

The ethylene-α-olefin random copolymer rubber used in this invention is a random copolymer rubber comprising ethylene and an α-olefin and is not particularly limited so long as it is such a rubber. The α-olefin has 3 or more, preferably 3–12 carbon atoms and is, for example, propylene, butene, pentene, hexene, heptene, octene, decene, and the like, preferred thereof being propylene, butene, hexene and octene.

The random copolymer rubber is, for example, an ethylene-propylene random copolymer rubber, ethylene-butene random copolymer rubber, ethylene-hexene random copolymer rubber, ethylene-octene random copolymer rubber, and the like. Preferred examples thereof are an ethylene-octene random copolymer rubber (2B), ethylene-butene random copolymer rubber (2C) and ethylene-propylene random copolymer rubber (2D).

The ethylene-octene random copolymer rubber (2B) used in this invention has a Q value, determined by the GPC method, of preferably not more than 2.5, more preferably not more than 2.3, and has an octene content of 15–45% by weight, preferably 18–42% by weight. The ethylene-octene random copolymer rubber has a MFR (according to JIS-K-6758, 190° C.) of preferably 1.0–15.0 g/10 min, more preferably 2–13 g/10 min.

When the Q value, determined by the GPC method, of the ethylene-octene random copolymer rubber (2B) exceeds 2.5, the rigidity tends to decrease in some cases. When the octene content in the ethylene-1-octene random copolymer rubber (2B) is less than 15% by weight, this is unfavorable in respect of the impact resistance; when it exceeds 45% by weight, a favorable result cannot be obtained in respect of the rigidity. When the MFR of the ethylene-octene random copolymer rubber (2B) exceeds 15 g/10 min, this is unfavorable in respect of the impact resistance; and when it is lower than 1.0 g/10 min, the dispersion of the rubber in the crystalline polypropylene-based resin (1) tends to be poor, leading to an unfavorable result in respect of the impact resistance.

The ethylene-1-butene random copolymer rubber (2C) used in this invention has a Q value, determined by the GPC method, of preferably not more than 2.7, more preferably not more than 2.5, and has a butene content of preferably 15–35% by weight, more preferably 17–33% by weight. The ethylene-butene random copolymer rubber (2C) has a MFR (according to JIS-k-6758, 190° C.) of preferably 1–15 g/10 min, more preferably 2–13 g/10 min.

When the Q value, determined by the GPC method, of the ethylene-butene random copolymer rubber (2C) exceeds 2.7, the rigidity tends to decrease in some cases. When the butene content in the ethylene-butene random copolymer rubber (2C) is less than 15% by weight, this is unfavorable in respect of the impact resistance; when it exceeds 35% by weight, a favorable result cannot be obtained in respect of the rigidity. When the MFR of the ethylene-butene random copolymer rubber is lower than 1 g/10 min, this is unfavorable in respect of the rigidity and impact resistance; when it exceeds 15 g/10 min, the dispersion of the rubber in the crystalline polypropylene-based resin (1) tends to be poor, leading to an unfavorable result in respect of the impact resistance.

The ethylene-propylene random copolymer rubber (2D) has a Q value, determined by the GPC method, of preferably not more than 2.7, more preferably not more than 2.5, has a propylene content of 20–30% by weight, preferably 22–28% by weight, and has a MFR (according to JIS-K-6758, 190° C.) of preferably 1–15 g/10 min, more preferably 2–13 g/10 min.

When the Q value, determined by the GPC method, of the ethylene-propylene random copolymer rubber (2D) exceeds 2.7, the rigidity tends to decrease. When the propylene content in the ethylene-propylene random copolymer rubber (2D) is lower than 20% by weight, this is unfavorable in respect of the impact resistance; when it exceeds 30% by weight, a favorable result cannot be obtained in respect of the rigidity in some cases. When the MFR of the ethylene-propylene random copolymer rubber (2D) is less than 1 g/10 min, this is unfavorable in respect of the rigidity and impact resistance; when it exceeds 15 g/10 min, the dispersion of the rubber in the crystalline polypropylene-based resin (1) tends to be poor, leading to an unfavorable result in respect of the impact resistance in some cases.

The ethylene-octene random copolymer rubber (2B), ethylene-butene random copolymer rubber (2C) and ethylene-propylene random copolymer rubber (2D) can be produced by copolymerizing ethylene with various α-olefins with a catalyst system comprising a vanadium compound and an organoaluminum compound, Ziegler-Natta catalyst system or metallocene catalyst system through a solution polymerization method, slurry polymerization method, high pressure ionic polymerization method or gas phase polymerization method.

The content of the elastomer (2) comprising a vinyl aromatic compound-containing rubber or comprising a vinyl aromatic compound-containing rubber and an ethylene-α-olefin random copolymer rubber relative to the whole of the thermoplastic resin composition of this invention is 10–30% by weight. When the content of the elastomer is less than 10% by weight, the impact resistance tends to decrease unfavorably; when it exceeds 30% by weight, the rigidity and the heat resistance tend to decrease unfavorably.

In using the above-mentioned rubber components (2A)–(2D), the respective contents of the various rubbers constituting the elastomer relative to the whole of the composition are, preferably, 3–15% by weight for the vinyl aromatic compound-containing rubber (2A), 0–15% by weight for the ethylene-octene random copolymer (2B), 0–10% by weight for the ethylene-butene random copolymer (2C) and 0–10% by weight for the ethylene-propylene random copolymer (2D).

In using the above-mentioned rubber components (2A)–(2D), it is preferable that the resulting resin composition contains the ethylene-octene random copolymer (2B), and it is further preferable that the composition contains both the ethylene-octene random copolymer (2B) and the ethylene-butene random copolymer (2C).

In the thermoplastic resin composition of this invention, furthermore, it is preferable that the contents (% by weight) and weight fractions of the respective components satisfy the following expressions 1)–3).

$$(X_{pp})+(X_{st})+(X_{EOR})+(X_{EBR})+(X_{EPR})+(X_{talc})=100, \quad 1)$$

$$0.20 \leq \{[(Y_{BC}) \times (Y_{EP})+(X_{st})+(X_{EOR})+(X_{EBR})+(X_{EPR})]/100\} \leq 0.30, \quad 2)$$

and $$0.1 \leq \{(Y_{BC}) \times (Y_{EP})/[(Y_{BC}) \times (Y_{EP})+(X_{st})+(X_{EOR})+(X_{EPR})+(X_{EPR})]\}, 3)$$

wherein ($X_{pp}$) is the content (% by weight) of the crystalline polypropylene, ($X_{st}$) is that of the vinyl aromatic compound-containing rubber (2A), ($X_{EOR}$) is that of the ethylene-octene random copolymer rubber (2B), ($X_{EBR}$) is that of the ethylene-butene random copolymer rubber (2C) and ($X_{EPR}$) is that of the ethylene-propylene random copolymer rubber (2D); ($Y_{BC}$) is the content (% by weight) of the crystalline ethylene-propylene block copolymer (1A), ($Y_{EP}$) is the weight fraction (weight fraction being content (% by weight)/100) of the ethylene-propylene random copolymer portion which is the second segment in the crystalline ethylene-propylene block copolymer (1A), and ($X_{talc}$) is the content (% by weight) of talc.

When the numerical value of $[(Y_{BC}) \times (Y_{EP})+(X_{st})+(X_{EOR})+(X_{EBR})+(X_{EPR})]/100$ in the above expression (2) is less than 0.20, the impact resistance tends to decrease unfavorably; when it exceeds 0.30, the fluidity tends to decrease unfavorably. When the numerical value of $(Y_{BC}) \times (Y_{EP})/[(Y_{BC}) \times (Y_{EP})+(X_{st})+(X_{EOR})+(X_{EBR})+(X_{EFR})]$ in the relational expression (3) for the weight fractions of respective components of the thermoplastic resin composition of this invention is less than 0.1, the impact resistance tends to decrease unfavorably.

The MFR (according to JIS-K-6758, 230° C.) of the thermoplastic resin composition of this invention is preferably not less than 35 g/10 min, because when it is less than 35 g/10 min, the fluidity tends to be poor, resulting in lowered moldability.

The talc used in this invention is a product obtained by pulverizing magnesium silicate hydrate. The crystal structure of its molecule assumes a three-layer structure of pyrophyllite type, and talc is composed of said layers piled one upon another. Particularly preferred are those in the form of plate obtained by finely grinding the crystals approximately to the extent of unit layers.

The average particle diameter of the talc used in this invention is not more than 3 μm. When it is more than 3 μm, the impact resistance of the thermoplastic resin composition of this invention tends to decrease greatly, and the appearance, such as gloss, also tends to be poor. The talc may be used as such without being treated; however, it may also be used after its surface has been treated, for the purpose of enhancing the interfacial adhesiveness to the crystalline polypropylene-based resin (1) and enhancing the dispersibility, with various known silane coupling agents, titanium-coupling agents, higher fatty acids, higher fatty acid esters, higher fatty acid amides, higher fatty acid salts or other surfactants.

The average particle diameter of talc herein means a fifty percent particle diameter D50 determined from the integral distribution curve of the undersize method obtained by subjecting a suspension of talc particles in a dispersion medium, such as water, alcohol or the like, to measurement by using a centrifugal sedimentation particle size distribution measuring apparatus.

The content of the talc used in this invention is 15–25% by weight relative to the whole of the thermoplastic resin composition. When the content of talc to be used is less than 15% by weight, the rigidity and the heat resistance tend to decrease, whereas when it exceeds 25% by weight, the impact resistance tends to decrease unfavorably and the appearance also tends to be poor.

The thermoplastic resin composition of this invention satisfies the following conditions (a)–(c). That is, at first, (a) when the crystalline polypropylene-based resin (1) has been melt-kneaded with the elastomer (2) comprising a vinyl aromatic compound-containing rubber or comprising a vinyl aromatic compound-containing rubber and an ethylene-a-olefin random copolymer rubber, it is necessary that the long period obtained by small angle X-ray scattering attributable to the vinyl aromatic compound-containing rubber is 12–24 nm.

The small angle X-ray scattering is, as described in known publications, for example, "X-sen Kaisetsu no Tebiki (Guide to X-ray Diffraction), published by Rigaku Denki (K.K.), 1989 ed.)", scattering in a small angle region of 2⊕ of not more than several degrees, and the "long period" refers to a periodic arrangement of crystalline portions and non-crystalline portions of approximately several ten to several hundred Å. The long period attributable to the vinyl aromatic compound-containing rubber can be obtained by regarding diffraction peaks other than known diffraction peaks attributable to the crystalline polypropylene resin as attributable to the vinyl-aromatic compound-containing rubber.

The long period attributable to the vinyl-aromatic compound-containing rubber is preferably 12–23 nm. When it exceeds 24 nm, it greatly deviates from the long period of crystalline polypropylene-based resin, and resultantly the interfacial adhesive strength (interaction) between the elastomer phase and the crystalline polypropylene-based resin phase decreases.

(b) When the crystalline polypropylene-based resin (1) has been melt-kneaded with the elastomer comprising a vinyl aromatic compound-containing rubber or comprising a vinyl aromatic compound-containing rubber and an ethylene-α-olefin random copolymer rubber, it is necessary that elastomer particles which undergo micro phase separation to have the form of particle, and are present in the vicinity of the interface between particles of the elastomer and polypropylene as matrix, have a particle diameter of not more than 30 nm.

The state of the vicinity of the interface between particles of the elastomer and crystalline polypropylene resin as matrix and the state of micro phase separation of elastomer particles present in the vicinity of the interface can be observed by a transmission type electron microscope (TEM). The shape of the particles can be judged by visually observing or photographing the transmitted image, and the particle diameter can be obtained by calculation based on the magnification of the microscope.

The particle diameter of the elastomer particles which undergo micro phase separation to have the form of particle, and are present in the vicinity of the interface between particles of the elastomer and polypropylene as matrix, are preferably not more than 25 nm. When the elastomer which is present in the vicinity of the interface between particles of the elastomer and crystalline polypropylene resin as matrix and undergo micro phase separation is in the form of rod or plate, or when, though it is in the form of particle, its diameter exceeds 30 nm, the impact resistance of the thermoplastic resin composition is decreased, and a favorable result cannot be obtained.

Furthermore, it is necessary that (c) the difference between the glass transition point ($Tg_1$) assigned to the crystalline propylene homopolymer portion of the crystalline polypropylene-based resin (1) and the glass transition point ($Tg_2$) assigned to the crystalline homopolymer portion of a composition obtained by melt-kneading the crystalline polypropylene-based resin (1) with the elastomer (2) comprising a vinyl aromatic compound-containing rubber or comprising a vinyl aromatic compound-containing rubber and an ethylene-α-olefin random copolymer rubber and talc (3) (that is, $\Delta Tg=Tg_1-Tg_2$) is 4.0–7.0° C.

The glass transition point herein referred to is the glass transition point in non-crystalline polymer, which is the temperature at which the non-crystalline polymer changes from the glass state to the rubber state (or conversely) and can be determined from the absorption peak obtained by the measurement of temperature dispersion of loss modulus. In the case of the crystalline polypropylene-based resin (1), in most instances only one glass transition point assigned to the crystalline propylene homopolymer portion is observed, which is designated $Tg_1$. In the case of a polymer obtained by melt-kneading a mixture of a crystalline polypropylene-based resin (1), an elastomer (2) comprising a vinyl aromatic compound-containing rubber or comprising a vinyl aromatic compound-containing rubber and an ethylene-α-olefin random copolymer rubber and talc (3), two glass transition points, that is, the glass transition point assigned to the crystalline propylene homopolymer portion and the glass transition point assigned to the elastomer portion are observed; of the two points, the glass transition point assigned to the crystalline propylene homopolymer portion is designated $Tg_2$. From these two glass transition points, the difference ($\Delta Tg=Tg_1-Tg_2$) between the glass transition points assigned to the crystalline propylene homopolymer portion can be obtained.

When the difference ($\Delta Tg=Tg_1-Tg_2$) in the glass transition point assigned to the crystalline propylene homopolymer portion is less than 4.0, the affinity between the crystalline polypropylene resin (1) and the elastomer (2) comprising a vinyl aromatic compound-containing rubber or comprising a vinyl aromatic compound-containing rubber and an ethylene-α-olefin random copolymer rubber tends to decrease greatly, resulting in the decrease of the impact resistance of the thermoplastic resin composition of this invention.

When the difference ($\Delta Tg=Tg_1-Tg_2$) in the glass transition point assigned to the crystalline propylene homopolymer portion exceeds 7.0° C., the affinity tends to be in excess, resulting unfavorably in the decrease of the rigidity and the heat resistance of the thermoplastic resin composition of this invention, and the favorable result can not be obtained.

The thermoplastic resin composition of this invention can be produced by using a kneader, such as a single screw extruder, a twin screw extruder, a Banbury mixer, a hot roll or the like. The addition to and mixing in the kneader of the respective components may be conducted at the same time or may be conducted in portions. The operations may be conducted, for example, according to the following methods, but they are not limited thereto.

(Method 1)

A method which comprises kneading the crystalline polypropylene-based resin (1) with the talc (3) and then adding thereto the elastomer (2) (hereinafter abbreviated as "elastomer") comprising a vinyl aromatic compound-containing rubber or comprising a vinyl aromatic compound-containing rubber and an ethylene-α-olefin random copolymer rubber.

(Method 2)

A method which comprises kneading the crystalline polypropylene-based resin (1) with talc in a high talc concentration beforehand to prepare a master batch and then separately kneading the master batch while diluting it with the crystalline polypropylene-based resin (1) and the elastomer (2), etc.

(Method 3)

A method which comprises kneading the crystalline polypropylene-based resin (1) with the elastomer (2), and then adding the talc (3) thereto and kneading the resulting mixture.

(Method 4)

A method which comprises kneading the crystalline polypropylene-based resin (1) with the elastomer (2) in a high elastomer concentration before-hand to prepare a master batch, and then adding thereto the crystalline polypropylene-based resin (1) and the talc (3) and kneading the resulting mixture.

(Method 5)

A method which comprises respectively kneading the crystalline polypropylene-based resin (1) with the talc (3) and the crystalline polypropylene-based resin (1) with the elastomer (2) beforehand and finally kneading them together.

The temperature required for the kneading is 170–250° C., preferably 190–230° C. The time necessary for the kneading is 1–20 minutes, preferably 3–15 minutes.

In these kneaders, in addition to these basic components, there can be compounded, as desired according to the objects of this invention, additives, such as an antioxidant, ultraviolet absorber, lubricant, pigment, antistatic agent, copper inhibitor, flame retardant, neutralizing agent, foaming agent, plasticizer, nucleating agent, foam inhibitor, cross-linking agent and the like.

The thermoplastic resin composition of this invention can be used for producing moldings of various shapes by the conventionally used injection molding method. The injection moldings thus obtained are suitably used particularly as automobile interior and exterior trim parts, such as a door trim, pillar, instrumental panel, bumper, and the like.

EMBODIMENTS

This invention is explained below with reference to Examples; however, they are merely for the sake of illustration and this invention is not limited to these Examples unless the gist thereof is overstepped.

Methods used for measuring physical properties in the Examples are shown below.

(1) Melt flow rate (MFR)

Determination was made according to the method prescribed in JIS-K-6758 under a load of 2.16 kg at a temperature of 190° C. or 230° C.

(2) Flexural test

Determination was made according to the method prescribed in JIS-K-7203. A test piece formed by injection molding was used. The thickness of the test piece was 6.4 mm, and flexural modulus (FM) and flexural yield strength (FS) were determined under the condition of a span of 100 mm and a loading rate of 2.0 mm/min. The measuring temperature was 23° C.

(3) Izod Impact Strength (IZOD)

Determination was made according to the method prescribed in JIS-K-7110. A test piece formed by injection molding was used. The thickness of the test piece was 6.4 mm. After molded, the test piece was notched, and the impact strength with notch was evaluated. The measuring temperature was −30° C. Determination was conducted after keeping the test piece in a constant temperature bath at the temperature for 2 hours.

(4) Brittle temperature (BP)

Determination was made according to the method prescribed in JIS-K-6758. A test piece having a given size of 6.3×38×2 mm was punched out of a flat plate having a size of 25×150×2 mm formed by injection molding and subjected to the measurement according to the given method.

(5) Heat distortion temperature (HDT)

Determination was made according to the method prescribed in JIS-K-7207. The fiber stress was 18.6 kg/cm².

(6) Tensile test

Determination was made according to the method prescribed in ASTM D 638. A test piece formed by injection molding was used. The tensile elongation at break (ultimate elongation, UE) and the tensile strength at yield (YS) were examined under conditions of a test piece thickness of 3.2 mm, a stretching speed of 10 mm/min and a measuring temperature of 23° C.

(7) Intrinsic viscosity

An Ubbellohde viscometer was used to measure reduced viscosities at three concentrations of 0.1, 0.2 and 0.5 g/dl. The intrinsic viscosity was determined by the calculation method described on page 491 of "Kobunshi Yoeki, Kobunshi Jikkengaku 11" published by Kyoritsu Shuppan Kabushiki Kaisah, 1982, namely an extrapolation method in which reduced viscosities are plotted against concentrations and the plot is extraporated to zero concentration.

For the crystalline polypropylene, teralin was used as a solvent and determination was made at a temperature of 135° C. For the ethylene-butene random copolymer rubber and the ethylene-propylene random copolymer rubber, xylene was used as a solvent and determination was made at a temperature of 70° C.

(7-1) Intrinsic viscosity of crystalline ethylene-propylene block copolymer (7-1a). Intrinsic viscosity of propylene homopolymer portion (first segment): $[\eta]_P$ The intrinsic viscosity $[\eta]_P$ of the propylene homopolymer portion, which is the first segment of the crystalline ethylene-propylene block copolymer, was determined by taking out a propylene homopolymer from the polymerization vessel after completion of polymerization of the propylene homopolymer portion, which is the first step in the production of the block copolymer, and measuring the $[\eta]_P$ of the propylene homopolymer taken out above.

(7-1b) Intrinsic viscosity of ethylene-propylene random copolymer portion (second segment): $[\eta]_{EP}$ The intrinsic viscosity $[\eta]_{EP}$ of the ethylene-propylene random copolymer portion, which is the second segment of the crystalline ethylene-propylene block copolymer, was obtained by measuring the intrinsic viscosity $[\eta]_P$ of the propylene homopolymer portion and the intrinsic viscosity $[\eta]_T$ of the whole of the ethylene-propylene block copolymer, respectively, followed by calculation using the weight ratio X of the ethylene-propylene random copolymer portion to the whole of the ethylene-propylene block copolymer according to the following equation:

$$[\eta]_{EP}=[\eta]_T/X-(1/X-1)[\eta]_P,$$

wherein $[\eta]_P$ is the intrinsic viscosity (dl/g) of propylene homopolymer portion and $[\eta]_T$ is the intrinsic viscosity (dl/g) of the whole of the block copolymer.

(7-1c) Weight ratio X of ethylene-propylene random copolymer portion to the whole of crystalline ethylene-propylene block copolymer The weight ratio X of the ethylene-propylene random copolymer portion to the whole of the crystalline ethylene-propylene block copolymer was obtained by measuring the heat of crystal melting of the propylene homopolymer portion (the first segment) and that of the whole of the crystalline ethylene-propylene block copolymer, respectively, followed by calculation using the following equation. The heat of crystal melting was determined by differential scanning colorimetry (DSC).

$$X=1-(\Delta H_f)_T/(\Delta H_f)_P$$

wherein $(\Delta H_f)_T$ is the heat of melting (cal/g) of the whole of the block copolymer and $(\Delta H_f)_P$ is the heat of melting (cal/g) of the propylene homopolymer portion.

(8) Ethylene content $(C2')_{EP}$ of ethylene-propylene random copolymer portion of crystalline ethylene-propylene block copolymer The ethylene content $(C2')_{EP}$ of ethylene-propylene copolymer portion of the crystalline ethylene-propylene block copolymer was obtained by measuring the ethylene content $(C2')_T$ (% by weight) of the whole of the crystalline ethylene-propylene random copolymer by infrared absorption spectrometry, followed by calculation using the following equation;

$$(C2')_{EP}(C2')_T/X$$

wherein $(C2')_T$ is the ethylene content (% by weight) of the whole of the block copolymer, $(C2')_{EP}$ is the ethylene content (% by weight) of the ethylene-propylene random copolymer portion, and X is the weight ratio of the ethylene-propylene random copolymer portion to the whole of the crystalline ethylene-propylene block copolymer.

(9) Isotactic pentad fraction

The "Isotactic pentad fraction" is the fraction of propylene monomer unit existing at the center of an isotactic chain in the form of a pentad unit, in other words a chain in which five propylene monomer units are successively meso-bonded, in the polypropylene molecular chain as measured by the method disclosed by A. Zambelli et al. in Macromolecules, 6,925 (1973), namely by use of $^{13}$C-NMR. However, the assignment of the NMR absorption peak was made based on Macromolecules, 8,687 (1975) published thereafter.

More specifically, the isotactic pentad fraction was determined as the area fraction of mmmm peak in the total absorption peaks in the methyl carbon region of the $^{13}$C-NMR spectrum. When the isotactic pentad fraction of NPL standard substance CRM No. M19-14, Polypropylene PP/MED/2 of NATIONAL PHYSICAL LABORATORY (England), was determined by the above-mentioned method, it was found to be 0.944.

(10) Molecular weight distribution

Determination was made by gel permeation chromatography (GPC) under the following condition (10-1) or (10-2).

(10-1) Crystalline polypropylene

GPC: Model 150C manufactured by Waters Company

Column: Two Shodex 80MA columns manufactured by Showa Denko K.K.

Amount of sample: 300 µl (polymer concentration 0.2 wt %)

Flow rate: 1 ml/min

Temperature: 135° C.

Solvent: o-Dichlorobenzene

A calibration curve relating to elution volume with molecular weight was prepared by using a standard polystyrene manufactured by TOSOH CORP. The weight average molecular weight and the number average molecular weight, respectively, in terms of polystyrene, of the specimen were determined by using the calibration curve, and the Q value (weight average molecular weight/number average molecular weight) was determined as a measure of molecular weight distribution.

(10-2) Ethylene-α-olefin random copolymer rubber

GPC: Model 150C manufactured by Waters Company

Column: Two Shodex 80 MA columns manufactured by Showa Denko K.K.

Amount of sample: 300 μl (polymer concentration 0.2 wt %)

Flow rate: 1 ml/min

Temperature: 145° C.

Solvent: o-Dichlorobenzene

A calibration curve relating to elution volume with molecular weight was prepared by using a Estandard polystyrene manufactured by TOSOH COPR. The weight average molecular weight and the number average molecular weight, respectively, in terms of polystyrene, of the specimen was determined by using the calibration curve, and the Q value (weight average molecular weight/number average molecular weight) was determined as a measure of molecular weight distribution.

(11) Long period obtained by small angle X-ray scattering

Determination was made by using an X-ray diffraction measuring apparatus (ROTA FLEX RU 200B, manufactured by Rigaku Denki K.K.) under the following conditions.

Anticathode: Cu rotary anticathode

Detector: PSPC, camera length: 1356 mm

X-ray intensity: 50 KV-100 mA, irradiation time: 8 hr

(12) Particle diameter of elastomer which has undergone micro phase separation

Determination was made by using a transmission type electron microscope (TEM-H 8000, manufactured by Hitachi, Ltd.) under the following conditions.

Acceleration voltage: 200 KV

Staining method: with 1% aqueous Ruo, solution, in steam at 60° C. for 2 hours

Sample preparation: a sample of 80–90 nm thick was prepared by cutting at a speed of 0.6 mm/sec at a temperature of −50 to −70° C. with a diamond knife by using an ultramicrotome.

(13) Glass transition point (Tg) and difference (ΔTg)

Determination was made with a solid visco-elasticity measuring apparatus under the following conditions.

Solid viscoelasticity measuring apparatus: Spectrometer SD 5600, manufactured by Seiko Denshi Kogyo K.K.

Frequency: 5 Hz

Measuring temperature: −150° C. to 80° C.

Glass transition point (Tg): Determined from the absorption peak obtained by the measurement of temperature dispersion of loss modulus.

Difference ($\Delta Tg = Tg_1 - Tg_2$): The difference ($\Delta Tg = Tgl_1 - Tg_2$) between the glass transition point ($Tg_1$) assigned to the crystalline propylene homopolymer portion of the crystalline polypropylene-based resin and the glass transition point ($Tg_2$) assigned to the crystalline propylene homopolymer portion present in a melt-kneaded mixture of the crystalline polypropylene-based resin (1), the elastomer (2) comprising a vinyl aromatic compound-containing rubber or comprising a vinyl aromatic compound-containing rubber and an ethylene-a-olefin random copolymer rubber and talc (3) was determined.

(14) Appearance

A test piece formed by injection molding was examined by visual observation to judge whether the appearance was good or bad.

Test pieces for evaluation of physical properties in (2), (3), (4), (5) and (6) above were prepared under the following injection molding conditions. The composition was dried by a hot air drier at 120° C. for 2 hours and thereafter injection-molded by using an injection molding machine, Model IS 150E-V manufactured by Toshiba Machine Co., Ltd., under the conditions of a molding temperature of 220° C., a mold-cooling temperature of 50° C., an injection time of 15 sec and a cooling time of 30 sec.

The thermoplastic resin compositions described below in the Examples and Comparative Examples were prepared under the following conditions. Given amounts of the respective components were measured, preliminarily mixed uniformly in a Henschel mixer and a tumbler and the resulting mixture was extruded by means of a twin-screw kneading extruder (TEX 44SS Model 30 BW-2V manufactured by Japan Steel Works, Ltd.) at an extrusion rate of 50 kg/hr and a screw revolution of 350 rpm under vent suction. The screw was constructed by arranging a triple thread type rotor and a kneading disc in two kneading zones which are the zone subsequent to the first feed inlet and the zone subsequent to the second feed inlet, respectively.

Table 1: Physical properties of crystalline polypropylene-based resin

Physical properties of the crystalline polypropylene-based resins used in Examples and Comparative Examples of this invention are shown in Table 1. The samples used are a crystalline ethylene-propylene block copolymer (referred to as BC) and a propylene homopolymer (referred to as PP), and the Table shows the Q values determined by the GPC method, intrinsic viscosities $[\eta]_p$ and isotactic pentad fractions mmmm of the propylene homopolymer portion of BC and the whole of PP (referred to as P portion). Further, the Table shows the intrinsic viscosity $[\eta]_{EP}$ of the ethylene-propylene random copolymer portion (referred to as EP portion) of BC, the content of the EP portion in BC (referred to as content 1) and the ethylene content in the EP portion (referred to as content 2).

Table 2: Physical properties of vinyl aromatic compound-containing rubber and ethylene-α-olefin random copolymer rubber Physical properties of the rubbers used in Examples and Comparative Examples of this Invention are shown in Table 2. The rubbers used are an ethylene-butene random copolymer rubber (referred to as EBR-1), two kinds of ethylene-ocetene random copolymer rubbers (EOR-1 and -2) and 4 kinds of styrene-ethylene-butene-styrene block copolymer rubbers (SEBS-1, -2, -3 and -4). The Table shows the-MFR of these rubbers, the comonomer content for EBR-1, EOR-1 and -2 and the styrene content for SEBS-1, -2, -3 and -4.

Table 3: Compounding ratio of crystalline polypropylene-based resin and elastomer Investigation was made on the conditions (a) and (b) to be satisfied when the crystalline polypropylene-based resin (1) shown in Table 1 and the elastomer shown in Table 2 are melt-kneaded. Table 3 shows the polymers and the compounding ratios thereof used in the investigation.

Table 4: Characteristic properties of polymer obtained by melt-kneading crystalline polypropylene-based resin with elastomer Polymers comprising the polymer species in the compounding ratios shown in Table 3 were melt-kneaded with a twin-screw kneader and then press-molded under the given conditions to prepare test pieces. Table 4 shows the long period determined by small angle X-ray scattering using the test piece and the result of evaluation of the particle diameter of elastomer obtained by TEM.

Referential Example 1

A mixture of 47 parts by weight of the crystalline ethylene-propylene block copolymer (BC), 38 parts by weight of the propylene homopolymer (PP) and 15 parts by weight of a styrene-ethylene-butene-styrene block copolymer rubber (SEBS-1) was melt-kneaded with a twin-screw kneader and then press-molded under the given conditions into test pieces. The test piece was used for small angle X-ray scattering determination to find that the long period attributable to the vinyl aromatic compound-containing rubber was 22 nm. This value was a preferable one which was nearer to the long period of polypropylene. When the vicinity of the interface between elastomer particles and polypropylene was observed by TEM, it was found that the elastomer particles which had undergone micro phase separation had the form of fine particle and the particle diameter was 20 nm. Thus, the styrene-ethylene-butene-styrene block copolymer rubber (SEBS-1) used in the present Referential Example 1 satisfied the conditions (a) and (b), which are to be satisfied when a crystalline polypropylene-based resin and an elastomer are melt-kneaded.

Referential Example 2

A mixture of 47 parts by weight of the crystalline ethylene-propylene block copolymer (BC), 38 parts by weight of the propylene homopolymer (PP) and 15 parts by weight of a styrene-ethylene-butene-styrene block copolymer rubber (SEBS-2) was melt-kneaded with a twin-screw kneader and then press-molded under the given conditions into test pieces. The test piece was used for determination of small angle X-ray scattering to find that the long period attributable to the vinyl aromatic compound-containing rubber was 21 nm. This value was a preferable one which was nearer to the long period of polypropylene. When the vicinity of the interface between elastomer particles and polypropylene was observed by TEM, it was found that the elastomer fine particles which had undergone micro phase separation had the form of fine particles and the particle diameter was 18 mm. Thus, the styrene-ethylene-butene-styrene block copolymer (SEBS-2) used in the present Referential Example 2 satisfied the conditions (a) and (b), which are to be satisfied when a crystalline polypropylene-based resin and an elastomer are melt-kneaded.

Referential Example 3

A mixture of 47 parts by weight of the crystalline ethylene-propylene block copolymer (BC), 38 parts by weight of the propylene homopolymer (PP), 7 parts by weight of an ethylene-octene random copolymer (EOR-1) and 8 parts by weight of a styrene-ethylene-butene-styrene block copolymer rubber (SEBS-1) was melt-kneaded with a twin-screw kneader and then press-molded under the given conditions into test pieces. The test piece was used for determination of small angle X-ray scattering to find that the long period attributable to the vinyl aromatic compound-containing rubber was 23 nm. This value was a preferable one which was nearer to the long period of polypropylene. When the vicinity of the interface between elastomer particles and polypropylene was observed by TEM, it was found that the elastomer particles which had undergone micro phase separation had the form of fine particles and the particle diameter was 20 nm. Thus, the styrene-ethylene-butene-styrene block copolymer rubber (SEBS-1) satisfied the conditions (a) and (b), which are to be satisfied when a crystalline polypropylene-based resin and elastomer are melt-kneaded.

Referential Example 4

A mixture of 47 parts by weight of the crystalline ethylene-propylene block copolymer (BC), 38 parts by weight of the propylene homopolymer (PP) and 15 parts by weight of a styrene-ethylene-butene-styrene block copolymer rubber (SEBS-3) was melt-kneaded with a twin-screw kneader and then press-molded under the given conditions into test pieces. The test piece was used for determination of small angle X-ray scattering to find that the long period attributable to the vinyl aromatic compound-containing rubber was 26 nm. When the vicinity of the interface between elastomer particles and polypropylene was observed by TEM, it was found that the elastomer particles which had undergone micro phase separation contained rod-formed particles admixed therein. Thus, the styrene-ethylene-butene-styrene block copolymer rubber (SEBS-3) used in the present Referential Example 4 did not satisfy the conditions (a) and (b), which are to be satisfied when a crystalline polystyrene-based resin and an elastomer are melt-kneaded.

Referential Example 5

A mixture of 47 parts by weight of the crystalline ethylene-propylene block copolymer (BC), 38 parts by weight of the propylene homopolymer (PP) and 15 parts by weight of a styrene-ethylene-butene-styrene block copolymer rubber (SEBS-4) was melt-kneaded with a twin-screw kneader and then press-molded under the given conditions into test pieces. The test piece was used for determination of small angle X-ray scattering to find that the long period attributable to the vinyl aromatic compound-containing rubber was 25 nm. When the vicinity of the interface between elastomer particles and polypropylene was observed by TEM, it was found that the elastomer particles which had undergone micro phase separation were in the form of rod. Thus, the styrene-ethylene-butene-styrene block copolymer rubber (SEBS-4) used in the present Referential Example 5 did not satisfy the conditions (a) and (b), which are to be satisfied when a crystalline polypropylene-based resin and an elastomer are melt-kneaded.

Table 5: Compounding ratio of crystalline polypropylene-based resin, elastomer and talc Investigation was made on the condition (c), which is to be satisfied when the crystalline polypropylene-based resin described in Table 1, the elastomer described in Table 2 and talc are melt-kneaded. The kinds of polymers and the compounding ratios thereof with talc, used in the investigation, are shown in Table 5.

Table 6: Difference ($\Delta Tg$) in glass transition point of polymer obtained by melt-kneading crystalline polypropylene-based resin, elastomer and talc, and physical property of resin composition Polypropylene-based resin compositions comprising the polymer species described in Table 5 and talc in compounding ratios described in the Table were obtained by melt-kneading with a twin-screw kneader and were injection-molded under the given conditions to prepare test pieces. The difference ($\Delta Tg$) in the glass transition point assigned to the crystalline propylene homopolymer portion obtained by using the test piece and the results of evaluation of physical properties of the composition are shown in Table 6.

EXAMPLE 1

A mixture of 30 parts by weight of the crystalline propylene-ethylene block copolymer (BC), 25 parts by weight of the propylene homopolymers (PP), 7.4 parts by weight of an ethylene-octene random copolymer rubber (EOR-2), 9.0 parts by weight of an ethylene-butene-1 random copolymer rubber (EBR-1), 7.6 parts by weight of a vinyl aromatic compound-containing rubber (SEBS-2) and 21 parts by weight of talc having an average particle diameter of 2.5 μm was melt-kneaded with a twin-screw kneader under the given conditions to obtain a polypropylene-based resin composition, which was then injection-molded into test pieces. The difference (ΔTg) in the glass transition point assigned to the crystalline propylene homopolymer portion obtained by using the test specimen was 5.8° C. and satisfied the condition (c), which is to be satisfied when a crystalline polypropylene-based resin, elastomer and talc are melt-kneaded. The MFR of the composition was 38 g/10 min (measuring temperature: 230° C.) and the physical properties thereof are shown in Table 6.

EXAMPLE 2

A mixture of 30 parts by weight of the crystalline propylene-ethylene block copolymer (BC), 26 parts by weight of the propylene homopolymer (PP), 7.4 parts by weight of an ethylene-ocetene random copolymer rubber (EOR-1), 8.0 parts by weight of an ethylene-butene-1 random copolymer rubber (EBR-1), 7.6 parts by weight of a vinyl aromatic compound-containing rubber (SEBS-2) and 21 parts by weight of talc having an average particle diameter of 2.5 μm was melt-kneaded with a twin-screw kneader under the given conditions to obtain a polypropylene-based resin composition, which was then injection-molded into test pieces. The difference (ΔTg) in the glass transition point assigned to the crystalline homopolymer portion obtained by using the test piece was 5.8° C. and satisfied the condition (c), which is to be satisfied when a crystalline polypropylene-based resin, elastomer and talc are melt-kneaded. The MFR of the composition was 42 g/10 min (measuring temperature: 230° C.) and the physical properties thereof are shown in Table 6.

EXAMPLE 3

A mixture of 30 parts by weight of the crystalline propylene-ethylene block copolymer (BC), 25 parts by weight of the propylene homopolymer (PP), 9.0 parts by weight of an ethylene-octene random copolymer rubber (EOR-1), 9.0 parts by weight of an ethylene-octene random copolymer rubber (EOR-2), 6.0 parts by weight of a vinyl aromatic compound-containing rubber (SEBS-1) and 21 parts by weight of talc having an average particle diameter of 2.5 μm was melt-kneaded with a twin-screw kneader under the given conditions to obtain a polypropylene-based resin composition, which was then injection-molded into test pieces. The difference (ΔTg) in the glass transition point assigned to the crystalline propylene homopolymer portion obtained by using the test piece was 5.3° C., and satisfied the condition (c), which is to be satisfied when a crystalline polypropylene-based resin, elastomer and talc are melt-kneaded. The MFR of the composition was 42 g/10 min (measuring temperature: 230° C.) and the physical properties thereof are shown in Table 6.

EXAMPLE 4

A mixture of 30 parts by weight of the crystalline propylene-ethylene block copolymer (BC), 26 parts by weight of the propylene homopolymer (PP), 23 parts by weight of a vinyl aromatic compound-containing rubber (SEBS-2) and 21 parts by weight of talc having an average particle diameter of 2.5 μm was melt-kneaded with a twin-screw kneader under the given conditions to obtain a polypropylene-based resin composition, which was then injection-molded into test pieces. The difference (ΔTg) in the glass transition point assigned to the crystalline propylene homopolymer portion no obtained by using the test piece was 4.5° C. and satisfied the condition (c), which is to be satisfied when a crystalline polypropylene-based resin, elastomer and talc are melt-kneaded. The MFR of the composition was 46 g/10 min (measuring temperature: 230° C.), and the physical properties thereof are shown in Table 6.

EXAMPLE 5

A mixture of 30 parts by weight of the crystalline propylene-ethylene block copolymer (BC), 26 parts by weight of the propylene homopolymer (PP), 15.4 parts by weight of an ethylene-octene random copolymer rubber (EOR-2), 7.6 parts by weight of a vinyl aromatic compound-containing rubber (SEBS-2) and 21 parts by weight of talc having an average particle diameter of 2.5 μm was melt-kneaded with a twin-screw kneader under the given conditions to obtain a polypropylene-based resin composition, which was then injection-molded into test pieces. The difference (ΔTg) in the glass transition point assigned to the crystalline propylene homopolymer portion obtained by using the test piece was 5.6° C. and satisfied the condition (c), which is to be satisfied when a crystalline polypropylene-based resin, elastomer and talc are melt-kneaded. The MFR of the composition was 42 g/10 min (measuring temperature: 230° C.), and the physical properties thereof are shown in Table 6.

Comparative Example 1

A mixture of 30 parts by weight of the crystalline propylene-ethylene block copolymer (BC), 26 parts by weight of the propylene homopolymer (PP), 7.4 parts by weight of an ethylene-octene random copolymer rubber (EOR-1), 8.0 parts by weight of an ethylene-butene-1 random copolymer rubber (EBR-1), 7.6 parts by weight of a vinyl aromatic compound-containing rubber (SEBS-3) and 21 parts by weight of talc having an average particle diameter of 2.5 μm was melt-kneaded with a twin-screw kneader under the given conditions to obtain a polypropylene resin composition, which was then injection-molded into test pieces. The difference (ΔTg) in the glass transition point assigned to the crystalline propylene homopolymer portion obtained by using the test piece was 3.2° C. and did not satisfy the condition (c), which is to be satisfied when a crystalline polypropylene-based resin, elastomer and talc are melt-kneaded. The MFR of the composition was 38 g/10 min (measuring temperature: 230° C.) and the physical properties thereof are shown in Table 6.

Comparative Example 2

A mixture of 30 parts by weight of the crystalline propylene-ethylene block copolymer (BC), 26 parts by weight of the propylene homopolymer (PP), 7.4 parts by weight of an ethylene-octene random copolymer rubber (EOR-1), 8.0 parts by weight of an ethylene-butene-1 random copolymer rubber (EBR-1), 7.6 parts by weight of a vinyl aromatic compound-containing rubber (SEBS-4) and 21 parts by weight of talc having an average particle diameter of 2.5 μm was melt-kneaded with a twin-screw kneader under the given conditions to obtain a polypropylene-based resin composition, which was then injection-molded into test pieces. The difference (ΔTg) in the glass transition point assigned to the crystalline propylene homopolymer portion obtained by using the test piece was 5.0° C. and did not satisfy the condition (c), which is to be satisfied when a crystalline polypropylene-based resin, elastomer and talc are melt-kneaded. The MFR of the composition was 39 g/10 min (measuring temperature: 230° C.) and the physical properties thereof are shown in Table 6.

Comparative Example 3

For a case wherein an elastomer comprising an ethylene-α-olefin random copolymer rubber was used in place of the elastomer comprising a vinyl aromatic compound-containing rubber or comprising a vinyl aromatic compound-containing rubber and an ethylene-α-olefin random copolymer rubber used in this invention (namely, for a case wherein the vinyl aromatic compound-containing rubber was not used), in other words, for a thermoplastic resin composition comprising a crystalline propylene-based resin, an elastomer comprising an ethylene-α-olefin random copolymer and talc, the physical properties of the composition are shown.

A mixture of 30 parts by weight of the crystalline propylene-ethylene block copolymer (BC), 26 parts by weight of the propylene homopolymer (PP), 23 parts by weight of an ethylene-octene random copolymer rubber (EOR-1) and 21 parts by weight of talc having an average particle diameter of 2.5 μm was melt-kneaded with a twin-screw kneader under the given conditions to obtain a polypropylene-based resin composition, which was then injection-molded into test pieces. The difference (ΔTg) in the glass transition point assigned to the crystalline propylene homopolymer portion obtained by using the test piece was 3.9° C. and did not satisfy the condition (c), which is to be satisfied when a crystalline polypropylene-based resin, elastomer and talc are melt-kneaded. The MFR of the composition was 39 g/10 min (measuring temperature: 230° C.) and the physical properties of the composition are shown in Table 6.

It can be seen that, in the thermoplastic resin compositions comprising a crystalline polypropylene-based resin (1), elastomer (2) and talc (3), as compared with the composition of Comparative Example 1 which does not satisfy the conditions (a) and (b) required when the crystalline polypropylene-based resin (1) and the elastomer are melt-kneaded and further does not satisfy the condition (c) required for the composition formed by melt-kneading the crystalline polypropylene-based resin (1), elastomer (2) and talc, and compared with the composition of Comparative Example 2, which satisfies the condition (c) but does not satisfy the conditions (a) and (b), the compositions of Examples 1, 2, 3, 4 and 5, as shown in Table 6, have excellent physical properties without marked deterioration of any of the properties, thus have a good balance among the properties and also have a good appearance.

It can be seen that the compositions of Examples 1, 2, 3, 4 and 5, as compared in physical properties with the compositions of Comparative Examples 1 and 2, are improved particularly in tensile break strength (UE), Izod impact strength (IZOD) and brittle temperature (BP) and further that by virtue of the improvement, a good balance of physical properties is maintained without any properties being markedly deteriorated.

It can be seen that, the compositions of Examples 1, 2, 3, 4 and 5, as compared in physical properties with the composition of Comparative Example 3, show, particularly, a lower brittle temperature (BP). That is, it can be seen that when a resin composition obtained by using a vinyl aromatic compound-containing rubber satisfies the conditions (a), (b) and (c), the resin composition has more excellent physical properties and better appearance than resin compositions obtained by using an ethylene-α-olefin random copolymer alone without using a vinyl aromatic compound-containing rubber.

TABLE 1

Physical property of crystalline polypropylene-based resin

| | | P portion | | | EP portion | |
|---|---|---|---|---|---|---|
| Sample | Q value | $[\eta]_{EP}$ (dl/g) | mmmm | $[\eta]_{EP}$ (dl/g) | Content 1 (wt %) | Content 2 (wt %) |
| BC | 4.0 | 0.8 | 0.99 | 6 | 11 | 32 |
| PP | 4.0 | 0.8 | 0.99 | | | |

Note:
BC: Ethylene-propylene block copolymer
PP: Propylene homopolymer
P portion: Propylene homopolymer portion of BC or whole of PP
EP portion: Ethylene-propylene random copolymer portion of BC
Content 1: Content of EP portion in BC
Content 2: Ethylene content in EP portion
mmmm: Isotactic pentad fraction

TABLE 2

Physical properties of vinyl aromatic compound-containing rubber and ethylene-α-olefin random copolymer rubber

| | MFR | | Comonomer | Styrene |
|---|---|---|---|---|
| Sample | Measuring temp. 190° C. | Measuring temp. 230° C. | content (wt %) | content (wt %) |
| EBR-1 | 2 | | 32 | |
| EOR-1 | 2 | | 40 | |
| EOR-2 | 5 | | 24 | |
| SEBS-1 | | 9 | | 13 |
| SEBS-2 | | 6 | | 18 |
| SEBS-3 | | 0.8 | | 20 |
| SEBS-4 | | 0.8 | | 40 |

Note:
EBR-1: Ethylene-1-butene copolymer rubber
EOR-1, 2: Ethylene-1-octene copolymer rubber
SEBS-1, 2, 3, 4: Vinyl aromatic compound-containing rubber

TABLE 3

Compounding ratio of crystalline polypropylene-based resin and elastomer

| | BC | PP | EOR-1 | SEBS-1 | SEBS-2 | SEBS-3 | SEBS-4 |
|---|---|---|---|---|---|---|---|
| Referential Example 1 | 47 | 38 | | 15 | | | |
| Referential Example 2 | 47 | 38 | | | 15 | | |
| Referential Example 3 | 47 | 38 | 7 | 8 | | | |
| Referential Example 4 | 47 | 38 | | | | 15 | |
| Referential Example 5 | 47 | 38 | | | | | 15 |

TABLE 4

Characteristic properties of polymer
obtained by melt-kneading crystalline polypropylene-
based resin and elastomer

|  | Long period determined by small angle X-ray scattering (nm)* | Particle diameter of elastomer determined by TEM (nm)** |
|---|---|---|
| Referential Example 1 | 22 | 20 |
| Referential Example 2 | 21 | 18 |
| Referential Example 3 | 23 | 20 |
| Referential Example 4 | 26 | Rod-form and particle-form |
| Referential Example 5 | 25 | Rod-form |

Note:
*: Long period attributable to vinyl aromatic compound -containing rubber when crystalline polypropylene -based resin is melt-kneaded with elastomer
**: Particle diameter of elastomer having undergone micro phase separation present in the vicinity of interface between dispersed elastomer particles and polypropylene

TABLE 5

Compounding ratio of crystalline polypropylene-based resin, elastomer and talc

Composition (wt %)

|  | BC | PP | EOR-1 | EOR-2 | EBR-1 | SEB S-1 | SEB S-2 | SEB S-3 | SEB S-4 | Talc |
|---|---|---|---|---|---|---|---|---|---|---|
| Example 1 | 30 | 25 |  | 7.4 | 9.0 |  | 7.6 |  |  | 21 |
| Example 2 | 30 | 26 | 7.4 |  | 8.0 |  | 7.6 |  |  | 21 |
| Example 3 | 30 | 25 | 9.0 | 9.0 |  | 6.0 |  |  |  | 21 |
| Example 4 | 30 | 26 |  |  |  |  | 23 |  |  | 21 |
| Example 5 | 30 | 26 | 15.4 |  |  |  | 7.6 |  |  | 21 |
| Comparative Example 1 | 30 | 26 | 7.4 |  | 8.0 |  |  | 7.6 |  | 21 |
| Comparative Example 2 | 30 | 26 | 7.4 |  | 8.0 |  |  |  | 7.6 | 21 |
| Comparative Example 3 | 30 | 26 | 23 |  |  |  |  |  |  | 21 |

TABLE 6

Difference (ΔTg) in glass transition
point of melt-kneaded polymer comprising crystalline
polypropylene-based resin, elastomer and talc and
physical properties of the polymer composition

|  | ΔTg | MFR | YS | UE | FM | FS | IZOD | HDT | BP | Appearance |
|---|---|---|---|---|---|---|---|---|---|---|
| Example 1 | 5.8 | 38 | 207 | 220 | 21100 | 313 | 4.5 | 72 | −22 | Good |
| Example 2 | 5.8 | 42 | 198 | 263 | 22100 | 309 | 4.9 | 72 | −23 | Good |
| Example 3 | 5.3 | 42 | 202 | 173 | 20000 | 303 | 4.5 | 71 | −23 | Good |
| Example 4 | 4.5 | 46 | 196 | 500 | 20700 | 310 | 5.9 | 72 | −32 | Good |
| Example 5 | 5.6 | 42 | 199 | 353 | 21800 | 306 | 5.3 | 73 | −25 | Good |
| Comparative Example 1 | 3.2 | 38 | 200 | 80 | 23200 | 310 | 4.2 | 73 | −19 | — |
| Comparative Example 2 | 5.0 | 39 | 206 | 62 | 23100 | 316 | 3.6 | 73 | −13 | — |
| Comparative Example 3 | 3.9 | 39 | 200 | 240 | 22100 | 306 | 4.5 | 73 | −21 | Bad |

Note:
MFR: Melt flow rate (g/10 min), measuring temp. 230° C.
YS: Tensile yield strength (Kg/cm$^2$)
UE: Tensile elongation at break (ultimate elongation) (Kg/cm$^2$)
FM: Flexural modulus (Kg/cm$^2$)
FS: Flexural yield strength (Kg/cm$^2$)
IZOD: Izod impact strength (Kg · cm/cm$^2$)
HDT: Heat distortion temperature (° C.)
BP: Brittle temperature (° C.)
ΔTg: Difference in glass transition point assigned to polypropylene homopolymer portion (° C.)

INDUSTRIAL APPLICABILITY

The polypropylene resin composition according to this invention is excellent in physical properties such as rigidity and impact strength, in processability such as fluidity, and in moldability and furthermore excellent in appearance of molded articles.

The polypropylene resin composition provided by this invention is suitably used, by virtue of such favorable properties, for injection moldings, particularly moldings for automobile interior and exterior trims uses.

What is claimed is:

1. A thermoplastic resin composition which is obtained by melt-kneading a mixture comprising (1) 55–75% by weight of a crystalline polypropylene-based resin, (2) 10–30% by weight of an elastomer comprising a vinyl aromatic compound-containing rubber and an ethylene-α-olefin random copolymer rubber, the ethylene-α-olefin random copolymer rubber comprising an ethylene-octene random copolymer rubber and (3) 15–25% by weight of talc having an average particle diameter of not more than 3 μm and which satisfies the following conditions (a)–(e):

(a) when the crystalline polypropylene-based resin (1) has been melt-kneaded with the elastomer (2) comprising a vinyl aromatic compound-containing rubber and an ethylene-α-olefin random copolymer rubber, the ethylene-α-olefin random copolymer rubber comprising an ethylene-octene random copolymer rubber, the long period obtained by small angle X-ray scattering attributable to the vinyl aromatic compound-containing rubber is 12–24 nm, (b) when the crystalline polypropylene-based resin (1) has been melt-kneaded with the elastomer (2) comprising a vinyl aromatic compound-containing rubber and an ethylene-α-olefin random copolymer rubber, the ethylene-α-olefin random copolymer rubber comprising an ethylene-octene random copolymer rubber, elastomer particles which undergo micro phase separation to have the form of particle, and are present in the vicinity of the interface between particles of the elastomer and the crystalline polypropylene-based resin as matrix, have a particle diameter of not more than 30 nm, and (c) the difference ($\Delta Tg = Tg_1 - Tg_2$) between the glass transition point ($Tg_1$) assigned to the crystalline propylene homopolymer portion of the crystalline polypropylene-based resin (1) and the glass transition point ($Tg_2$) assigned to the crystalline propylene homopolymer portion of a composition obtained by melt-kneading the crystalline polypropylene-based resin (1) with the elastomer (2) comprising a vinyl aromatic compound-containing rubber and an ethylene-α-olefin random copolymer, the ethylene-α-olefin random copolymer rubber comprising an ethylene=octane random rubber, and talc (3) is 4.0–7.0° C.

2. The thermoplastic resin composition according to claim 1 wherein the crystalline polypropylene-based resin (1) is a crystalline polypropylene selected from (1A) or (1B) described below:

(1A) a crystalline ethylene-propylene block copolymer wherein the propylene homopolymer portion, which is the first segment, has a Q value of 3.0–5.0, which value is the ratio of the weight average molecular weight (Mw) to the number average molecular weight (Mn) determined by the gel permeation chromatography (GPC) method, has an isotactic pentad fraction of not less than 0.98 as calculated from $^{11}$C-NMR and has an intrinsic viscosity of 0.7–1.1 dl/g as determined in tetralin solution at 135° C., and the ethylene-propylene random copolymer portion, which is the second segment, has an intrinsic viscosity of 5.0–8.0 dl/g as determined in tetralin solution at 135° C. and has an ratio of ethylene to propylene of 25/75 to 35/65 (weight ratio), and (1B) a mixture of the crystalline ethylene-propylene block copolymer (1A) with a crystalline propylene homopolymer having a Q value of 3.0–5.0 as determined by the GPC method, an isotactic pentad fraction of not less than 0.98 as calculated from $^{13}$C-NMR and an intrinsic viscosity of 0.7–1.1 dl/g as determined in tetralin solution at 135° C.

3. The thermoplastic resin composition according to claim 1 wherein the elastomer (2) is an elastomer comprising a vinyl aromatic compound-containing rubber and at least two kinds of ethylene-α-olefin random copolymer rubbers.

4. The thermoplastic resin composition according to claim 3 wherein the elastomer (2) is an elastomer which comprises (2A) a vinyl aromatic compound-containing rubber described below and at least two kinds of ethylene-α-olefin random copolymer rubbers selected from (2B) an ethylene-octene random copolymer rubber, (2C) an ethylene-butene random copolymer rubber or (2D) an ethylene-propylene random copolymer rubber and wherein the contents of the respective rubber components relative to the whole of the composition are as shown below:

(2A) 3–15% by weight of a vinyl aromatic compound-containing rubber which is a block copolymer comprising a vinyl aromatic compound polymer block and a conjugated diene type polymer block, 80% or more of the double bonds of the conjugated diene portion being hydrogenated, and has a Q value of not more than 2.5 as determined by the GPC method, a vinyl aromatic compound content of 10–20% by weight and a flow rate of 1–15 g/10 min as determined according to JIS-K-6758 at 230° C.

(2C) 0–10% by weight of an ethylene-butene random copolymer rubber which has a Q-value of not more than 2.7 as determined by the GPC method, a butene content of 15–35% by weight and a melt flow rate of 1–15 g/10 as determined according to JIS-K-6758 at 190° C., and (2D) 0–10% by weight of an ethylene-propylene random copolymer rubber which has a Q value of not more than 2.7 as determined by the GPC method, a propylene content of 20–30% by weight and a melt flow rate of 1–15 g/10 min as determined according to JIS-K-6758 at 190° C.

5. The thermoplastic resin composition according to claim 4 wherein the thermoplastic resin composition satisfies the following expressions 1)–3) and the melt flow rate of the composition is not less than 35 g/10 min as determined according to JIS-K-6758 at 230° C.:

$$(X_{pp})+(X_{st})+(X_{EOR})+(X_{EBR})+(X_{EPR})(X_{talc})=100, \quad 1)$$

$$0.20 \leq \{[(Y_{BC}) \times (Y_{EP})+(X_{st})+(X_{EOR})+(X_{EBR})+(X_{EPR})]/100\} \leq 0.30, \quad 2)$$

and $$0.1 \leq \{(Y_{BC}) \times (Y_{EP})/[(Y_{BC}) \times (Y_{EP})+(X_{st})+(X_{EOR})+(X_{EBR})+(X_{EPR})]\}, 3)$$

wherein ($X_{pp}$) is the content (% by weight) of the crystalline polypropylene, ($X_{st}$) is that of the vinyl aromatic compound-containing rubber (2A), ($X_{EOR}$) is that of the ethylene-octene random copolymer rubber (2B), ($X_{EBR}$) is that of the ethylene-butene random copolymer rubber (2C) and ($X_{EPR}$) is that of ethylene-propylene random copolymer rubber (2D); ($Y_{BC}$) is the content (% by weight) of the crystalline ethylene-propylene block copolymer (1A) and ($Y_{EP}$) is the weight fraction (weight fraction being content (% by weight)/100) of the ethylene-propylene random copolymer portion, which is the second segment in the crystalline ethylene-propylene block copolymer (1A); and ($X_{talc}$) is the content (% by weight) of talc.

6. A injection molding obtained by injection-molding the thermoplastic resin composition according to claim 1.

7. The injection molding according to claim 6 which is an injection molding for automobile interior and exterior trims.

* * * * *